United States Patent

Graves

[15] 3,695,636
[45] Oct. 3, 1972

[54] FLEXIBLE TUBE JOINT USING SEGMENTED COUPLING

[72] Inventor: Robert W. Graves, Woodland Hills, Calif.

[73] Assignee: Aeroquip Corporation, Jackson, Mich.

[22] Filed: April 3, 1970

[21] Appl. No.: 25,333

[52] U.S. Cl. ................285/47, 285/165, 285/233, 285/424
[51] Int. Cl. ............................................F16l 5/00
[58] Field of Search......285/233, 234, 163, 164, 424, 285/187, 261, 165, 266, 47

[56] References Cited

UNITED STATES PATENTS

| 3,540,758 | 11/1970 | Torres | 285/233 |
| 2,852,282 | 9/1958 | Smisko | 285/266 X |
| 3,116,078 | 12/1963 | Scherer | 285/373 X |
| 3,443,828 | 5/1969 | Hole | 285/266 |
| 3,438,657 | 4/1969 | Torres | 285/233 |

Primary Examiner—Dave W. Arola
Attorney—Jerry K. Harness

[57] ABSTRACT

A hot air duct connection which allows for tube expansion and contraction. A pair of flanges are secured to the ducts and support seals which engage a surrounding sleeve. The flanges carry ball segment members which are surrounded by a complementary retainer to permit limited rocking action of the flanges while restraining them against axial separation and maintaining the seal.

5 Claims, 7 Drawing Figures

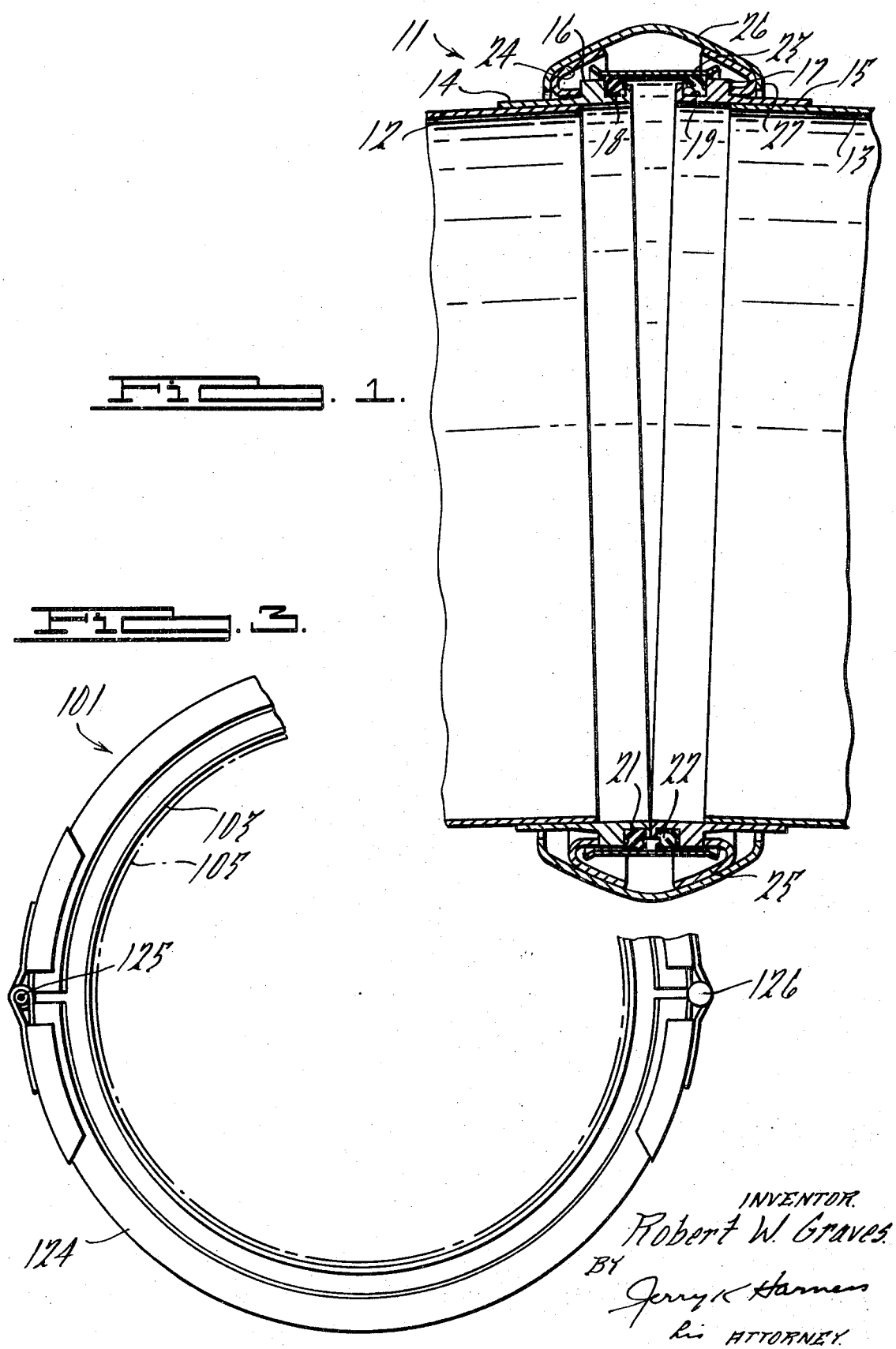

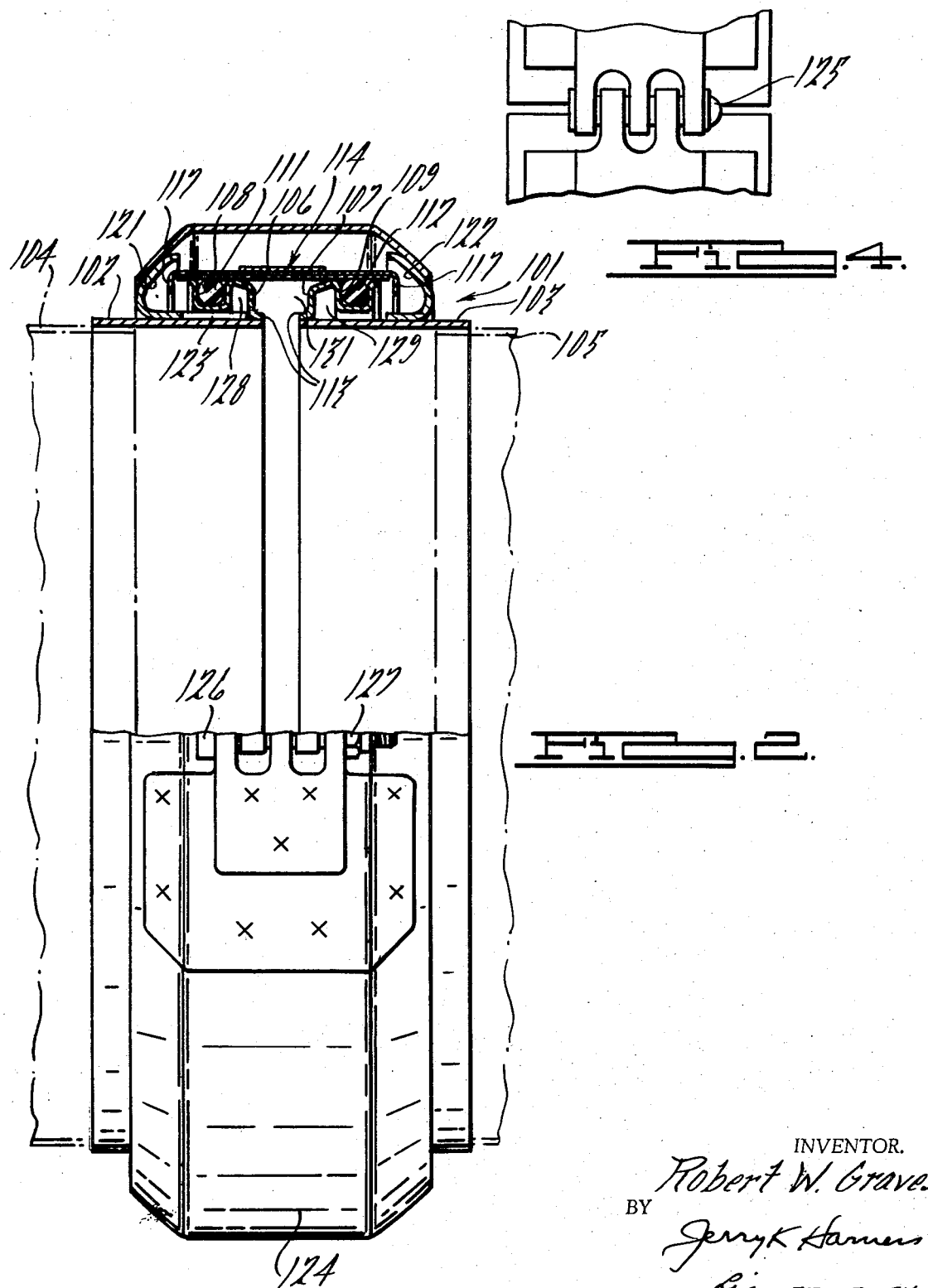

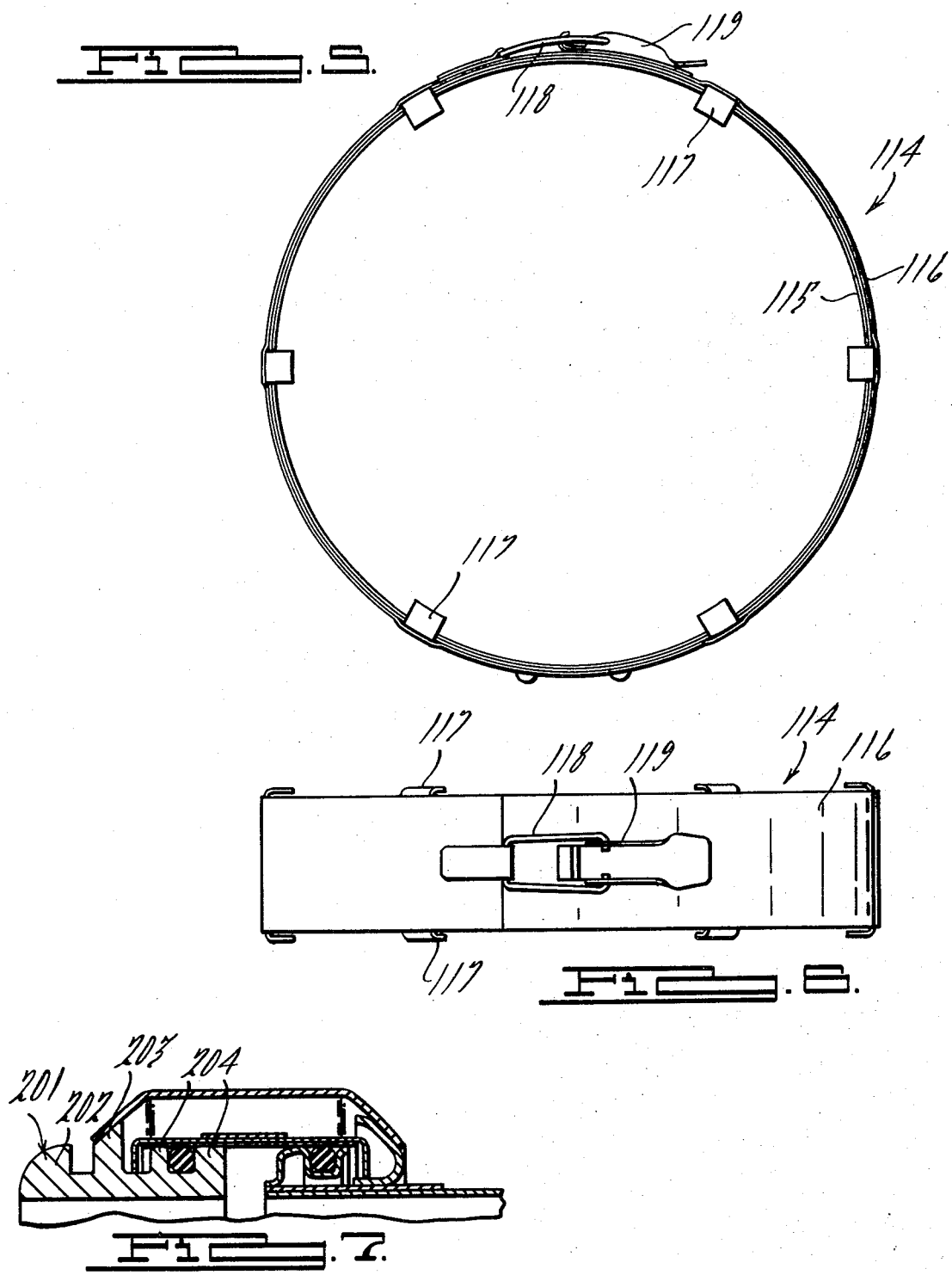

3,695,636

FLEXIBLE TUBE JOINT USING SEGMENTED COUPLING

BACKGROUND OF THE INVENTION

1. Field of the Invention

The invention relates to ducting connections, and more particularly to joints for low pressure conduits such as hot air ducts which are not subjected to major axial forces, but must be capable of rocking movement to accommodate expansion and contraction of the ducts which they connect.

2. Description of the Prior Art

Conventionally, ball types of connections have been used for duct joints of this type, but they are relatively expensive to construct and are heavy and cumbersome. Bellows connections have also been used, but these must be surrounded by wire braid to provide the required axial restraint.

BRIEF SUMMARY OF THE INVENTION

According to the invention, a pair of flanges are provided which are securable to the ducts to be connected. In one embodiment of the invention, these flanges are provided with integral outer grooves for the retention of rubberlike seals, whereas in another version the seal holders comprise separate grooved sheet metal members secured to the flanges. A retainer sleeve is engageable by the seals which are slidable within the sleeve to allow said rocking action to take place.

A pair of annular ball segment members are mounted on the flanges, these members being restrained against axial movement and engaging the interior of a concave retainer. The ball segments may thus slide within the retainer to allow bending of the joint while still exerting restraint against axial separating movement. In one version of the invention, one of the flanges is provided with an integral ball segment portion and is adapted to be used with an equipment flange rather than a duct end.

BRIEF DESCRIPTION OF THE DRAWINGS

FIG. 1 is a cross-sectional view in elevation of one embodiment of the invention which has the seal holding grooves integrally formed on the flanges, the latter being shown in angular relation;

FIG. 2 is a partially cross-sectioned elevational view of a second embodiment of the invention in which separate seal holders are secured to the flanges;

FIG. 3 is a side elevational view of the embodiment of FIG. 2 showing the hinged nature of the ball segment retainer;

FIG. 4 is a fragmentary elevational view of a hinge pin for the retainer;

FIG. 5 is a side elevational view of the seal retainer of the embodiment of FIG. 2, showing the tabs which limit axial movement of the retainer;

FIG. 6 is a top plan view thereof, showing the fastener for the retainer; and

FIG. 7 is a fragmentary cross-sectional view in elevation of the third embodiment of the invention which is similar t' the embodiment of FIG. 2 but in which one of the flanges has an integrally formed ball segment portion and is adapted for use with an equipment flange.

DESCRIPTION OF THE PREFERRED EMBODIMENTS

Referring first to the embodiment of FIG. 1, the joint is generally indicated at 11 and is intended to connect a pair of ducts 12 and 13 such as are used to conduct warm air in a heating system. In order for such joints to allow for expansion and contraction of the warm air ducts, they must be capable of limited rocking movement. The flexible joint comprises a pair of flanges 14 and 15 of generally cylindrical shape and adapted to be secured by welding or other appropriate means to ducts 12 and 13 respectively, the flanges surrounding the end portions of the ducts.

Seal holding means are formed integrally with flanges 14 and 15, this means comprising enlarged portions 16 and 17 on the flanges having seal retaining grooves 18 and 19 respectively. A pair of resilient seals 21 and 22 are disposed in these grooves and project slightly outwardly therefrom.

A seal retaining sleeve 23 surrounds and is engageable with seals 21 and 22. This sleeve comprises a sheet metal member which is not restrained against axial movement except as hereinafter described. The pressure of warm air within the ducts will force seals 21 and 22 against sleeve 23 to prevent air leakage from the conduit.

A pair of ball segment members 24 and 25 are mounted on flanges 14 and 15 respectively immediately outside of seal holding portions 16 and 17. These members are fabricated of sheet metal and are of annular shape, having reversely bent cross-sectional shapes with the outer portion slightly convex. The inner portions of these segments engage the seal holding portions 16 and 17 of the flanges, but their diameter is slightly larger than the flange diameter so that radial movement between the ball segment members and the flanges will be permitted, as seen in FIG. 1. The ball segment members are also adjacent the seal retainer ring 23 so that the axial movement of this ring will be limited in both directions.

A ball segment retainer 26 surrounds members 24 and 25. This member is likewise of sheet metal construction and surrounds the major portions of members 24 and 25. The concave interior surface of member 26 is complementary to the outer surfaces of members 24 and 25 so that a ball joint type of action will occur when rocking of the joint takes place. Member 26 is hinged to permit assembly in a manner which will be described in further detail with respect to the second embodiment of the invention. The width of retainer 26 is sufficient to permit relative angular rocking between flanges 14 and 15.

To assemble the joint, after having secured flanges 14 and 15 to their respective ducts with segments 24 and 25 in position, seals 21 and 22 will be placed in their respective grooves and sleeve 23 slipped thereover. Retainer 26 will then be closed around ball segments 24 and 25 to complete the assembly.

It will be noted that when rocking of joint 11 takes place, the radial movement of segments 24 and 25 permitted with respect to the flanges will allow the latter to rock about an axis other than the center of the joint. The engagement of segments 24 and 25 with portions 16 and 17 of the flanges and with retainer 26 will limit axial separating movement of the joint flanges. The maximum amount of rocking will be limited by the downwardly extending flange portions 27 of retainer 26 as they are engaged by members 24 and 25.

FIGS. 2 to 6 illustrate a second embodiment of the invention which is generally similar to the previous embodiment but in which the seal holders are separately fabricated, the seal retainer sleeve is of different construction, and the ball segments have a closer fit with the flanges. The joint is generally indicated at 101 and comprises a pair of flanges 102 and 103 which are cylindrical in shape and attachable to ducts 104 and 105 respectively. Annular seal holders 106 and 107 are secured to flanges 102 and 103, and have grooves 108 and 109 for the reception of seals 111 and 112 respectively. The inner end portions 113 of these holders are secured to the ends of flanges 102 and 103, and the remainder of the holders are spaced slightly outwardly from their respective flanges.

The seal retainer sleeve is generally indicated at 114 and its construction is best seen in FIGS. 5 and 6. The retainer sleeve has an inner band 115 and an outer band 116 between which are secured a plurality of circumferentially spaced U-shaped tabs 117. The ends of these tabs are spaced axially from holders 106 and 107 and extend radially inwardly past them to limit axial movement of the sleeve. Sleeve 114 is split and may be opened to be mounted in position, being held closed by a releasable fastener 118 which engages a bracket 119 on the sleeve.

Ball segment members 121 and 122 are mounted on flanges 102 and 103 respectively and are shaped in the same general manner as those in the previous embodiment. However a plurality of stops 123 extend axially from the inner portions of the segments and pass under the main portions of seal holders 106 and 107 to engage the inner ends of these holders. Stops 123 will prevent unwanted inward axial movement of segments 121 and 122.

A retainer 124 surrounds the ball segments as in the previous embodiment. This retainer is made of two pieces hinged at 125 as shown in FIG. 4. A cap screw 126 and nut 127 releasably secure the other mating ends of the retainer halves.

In using joint 101, it will be noted that while rocking movement is permitted as the ball segments slide inside the retainer, the segments will not move radially with respect to the flanges, so that rocking will occur about the central joint axis. It should also be observed that spaces 128 and 129 beneath seal holders 106 and 107 respectively will form annular ambient air pockets between the main flow path and sleeve 114. These pockets, in conjunction with the inherent stagnant air pocket 131, will maintain the temperature of seals 111 and 112 below the mainstream temperature.

FIG. 7 shows a third embodiment of the invention which is similar to that of FIGS. 2 to 6 except that one of the flanges and its associated parts is replaced by a one-piece flange generally indicated at 201. This flange comprises a connecting portion 202 adapted to be used with an equipment flange (not shown), an integral ball segment portion 203, and an integral seal holding portion 204. The operation of this unit will be the same as that previously described.

What is claimed is:

1. In a flexible joint for connecting two warm air ducts or the like, a pair of flanges securable to said ducts, seal holders fixed to said flanges and having grooves, resilient seals retained in said grooves and projecting slightly outwardly therefrom, a sleeve surrounding and engageable by said seals, the seals having limited axial movement with respect to said sleeve, a pair of sheet metal ball segments carried by said flanges axially outwardly of said seal holders, means limiting the axial movement of said segments toward each other, and a retainer of a generally rounded cross-sectional configuration surrounding said ball segments, the ball segments and retainer having complementary mating surfaces, the width of said retainer being sufficient to hold said joint together and to permit angular rocking of said flanges with respect to each other with said seals sliding in said sleeve, the minimum inner diameters of said ball segment members being slightly larger than the diameters of said flanges and less than the maximum diameter of said seal holders whereby relative radial movement between the ball segment members and flanges will be permitted when the flanges are rocked.

2. In a flexible joint for connecting two warm air ducts or the like, a pair of flanges securable to said ducts, seal holders fixed to said flanges and having grooves, resilient seals retained in said grooves and projecting slightly outwardly therefrom, a sleeve surrounding and engageable by said seals, the seals having limited axial movement with respect to said sleeve, a pair of sheet metal ball segments carried by said flanges axially outwardly of said seal holders, means limiting the axial movement of said segments toward each other, and a retainer of a generally rounded cross-sectional configuration surrounding said ball segments, the ball segments and retainer having complementary mating surfaces, the width of said retainer being sufficient to hold said joint together and to permit angular rocking of said flanges with respect to each other with said seals sliding in said sleeve, said seal holders comprising separate sheet metal members secured at their inner ends to said flanges, the spaces between said inner ends and said grooves forming ambient air pockets to reduce the temperature of said seals.

3. The combination according to claim 2, said sleeve having downwardly extending tabs at the outer ends thereof to limit axial movement of the sleeve.

4. The combination according to claim 2, said ball segment members being of sheet metal construction and having circumferentially spaced stops extending under said seal holders and engaging the inner ends thereof.

5. The combination according to claim 2, said retainer being of hinged construction with its outer ends releasably connectable for mounting on said ball segments.

* * * * *